(12) United States Patent
Fei (10) Patent No.: US 6,707,214 B1
(45) Date of Patent: Mar. 16, 2004

(54) PSC MOTOR HAVING A 4/6-POLE COMMON WINDING AND HAVING AN ADDITIONAL 4-POLE WINDING

(75) Inventor: Renyan W. Fei, Qingdao (CN)

(73) Assignee: Emerson Electric Co., St. Louis, MO (US)

( * ) Notice: Subject to any disclaimer, the term of this patent is extended or adjusted under 35 U.S.C. 154(b) by 9 days.

(21) Appl. No.: 10/383,977

(22) Filed: Mar. 7, 2003

Related U.S. Application Data (63) Continuation-in-part of application No. 10/229,409, filed on Aug. 28, 2002, now abandoned.

(51) Int. Cl.[7] .............................................. H02K 3/00
(52) U.S. Cl. ...................... 310/184; 310/179; 318/776
(58) Field of Search ................................ 310/184, 179, 310/180, 198, 191, 209; 318/772, 774, 776

(56) References Cited

U.S. PATENT DOCUMENTS

| 4,284,919 A | 8/1981 | Auinger |
| 4,322,665 A | 3/1982 | Landgraf |
| 5,825,111 A | 10/1998 | Fei |
| 6,175,209 B1 | 1/2001 | Fei |
| 6,255,755 B1 | 7/2001 | Fei |
| 6,271,639 B1 | 8/2001 | Fei |

*Primary Examiner*—Dang Le
(74) *Attorney, Agent, or Firm*—Senniger, Powers, Leavitt & Roedel

(57) ABSTRACT

A 4/6 pole PSC motor having main and auxiliary winding configurations. Common windings are energized in both a 4-pole configuration and energized in a 6-pole configuration for both the main and the auxiliary winding configurations. An additional winding is energized in the 4-pole configuration only. As a result, the air-gap flux level of the 4-pole configuration can be varied substantially independent of the air-gap flux level of the 6-pole configuration by varying the configuration of the additional winding.

24 Claims, 7 Drawing Sheets

PSC MOTOR HAVING A 4/6-POLE COMMON WINDING AND HAVING AN ADDITIONAL 4-POLE WINDING

This application is a continuation-in-part of application Ser. No. 10/229,409, filed Aug. 28, 2002, now abandoned.

BACKGROUND OF THE INVENTION

1. Field of the Invention

The invention generally relates to permanent-split capacitor (PSC) motors and, in particular, to a reversible 4-pole/6-pole motor having a common winding in both the 4-pole configuration and the 6-pole configuration and having an additional winding in the 4-pole configuration only.

2. Description of the Prior Art

PSC motors, as one kind of single-phase induction motors, come in various multiple configurations and various pole configurations. For example, PSC motors are frequently used to drive washing machines for clothing. In particular, a 4-pole PSC has been used in vertical axis impeller washers. "However, such impeller washers do not have a lower speed for a delicate washing cycle. In order to provide a variable speed motor which can operate at a slower speed for a delicate washing cycle, some configurations have used brushless permanent magnet motors, switched reluctance motors, or three-phase induction motors in combination with an electronic controller in place of the PSC motors." However, these configurations are expensive to produce.

One solution to this problem is described in co-invented, co-assigned U.S. Pat. No. 5,825,111 for SINGLE-PHASE INDUCTION MOTOR 4/6 POLE COMMON WINDING CONNECTION WITH MAGNETIC MOTIVE FORCE SYMMETRICALLY DISTRIBUTED, the entire disclosure of which is incorporated herein in its entirety. In this patent, a 4/6 pole PSC motor is described that provides a full shared winding and symmetrically distributed magnetic motive forces (MMF) for the 4-pole and 6-pole configurations. However, this motor has an air-gap flux density in the 4-pole configuration, which is about 18% higher than the air-gap flux density in the 6-pole configuration. In addition, the 4-pole forward and backward configurations have different break down torques (BDT) because of the higher resistance in the main winding energized in backward operation as compared to the resistance in the main winding energized in forward operation.

With increasing demand for impeller washers to have lower cost and higher performance, there is a need for a PSC motor which can operate at higher speeds to drive a regular washing cycle and which can also operate at lower speeds to drive a delicate washing cycle. In particular, there is a need for a reversible two-speed PSC motor having a high-speed configuration and having a low-speed configuration in which the air-gap flux density of both speed configurations can each be varied substantially independent of each other. There is also a need for a reversible two-speed PSC motor generating magnetic motive forces, which are symmetrically distributed about an air-gap between a rotor and a stator of the motor in both speeds.

SUMMARY OF THE INVENTION

To provide independently adjustable air-gap flux density in both speeds, the invention employs a new winding configuration. In this new configuration, the 4-pole configuration has an additional winding which is not energized in the 6-pole configuration. Both the 4-pole and 6-pole configurations achieve very good performance with this configuration. The additional winding has no effect on operation in the 6-pole configuration and reduces the saturation level for operation in the 4-pole configuration so that forward operation in the 4-pole configuration has a desirable saturation level independent of the 6-pole configuration. In the motor described in U.S. Pat. No. 5,825,111, the backward operation in the 4-pole configuration has a substantially lower saturation and break down torque (BDT) than forward operation in the 4-pole configuration because of the smaller wire size and higher resistance in the main winding. In the motor of the invention, the BDT during the backward operation in the 4-pole configuration is substantially increased because of the increased turns in the auxiliary winding.

It is an object of this invention to provide a 4-pole/6-pole PSC motor having a common main winding in both the 4-pole configuration and the 6-pole configuration and having an additional winding in the 4-pole configuration only; to provide such a motor which has efficient operation at two different speeds; and to provide such a motor which can be manufactured without significant re-tooling or redesign.

In one form, the invention is a 4/6 pole PSC motor having main and auxiliary winding configurations and having common windings energized in both a 4-pole configuration and energized in a 6-pole configuration for both the main and the auxiliary winding configurations. An additional winding is energized in the 4-pole configuration only. As a result, the air-gap flux level of the 4-pole configuration can be varied substantially independent of the air-gap flux level of the 6-pole configuration by varying the configuration of the additional winding.

In another form, the invention is a motor comprising a stator core, a rotor mounted in rotational relationship with the stator core, a plurality of windings components wound on the stator core, and an additional winding component wound on the stator core. The winding components are configured to be selectively energized to operate the motor in a 4N-pole configuration (N being an integer equal to or greater than one) in which the plurality of winding components and the additional winding component are energized. The winding components are configured to be selectively energized to operate the motor in a 6N-pole configuration in which the plurality of winding components only are energized. The additional winding component is not energized in the 6N-pole configuration and the additional winding component is energized only in the 4N-pole configuration.

In yet another form, the invention is an electric motor system comprising a pair of line terminals for connection to an external source of power, a stator core, a first winding coil group including four coil sets disposed in magnetic coupling relationship with the core, a second winding coil group including four coil sets disposed in magnetic coupling relationship to the core, a third winding coil group including four coil sets disposed in magnetic coupling relationship with the core, an additional winding coil including additional coil sets disposed in magnetic coupling relationship with the core and a switch assembly. The switch assembly is operatively connected to the first, the second, and the third winding coil groups and to the additional winding coil so as to change current flow direction in selected ones of the coil sets to provide a 4-pole configuration in one connection in which the additional winding coil is energized, and a 6-pole configuration in another connection in which the additional winding coil is not energized.

Other objects and features will be in part apparent and in part pointed out hereinafter.

BRIEF DESCRIPTION OF THE DRAWINGS

FIG. 4A corresponds to schematic diagram of FIG. 3A.

FIG. 4B corresponds to the schematic diagram of FIG. 3B.

Corresponding reference characters indicate corresponding parts throughout the drawings.

DETAILED DESCRIPTION OF THE PREFERRED EMBODIMENTS

Figure 1:
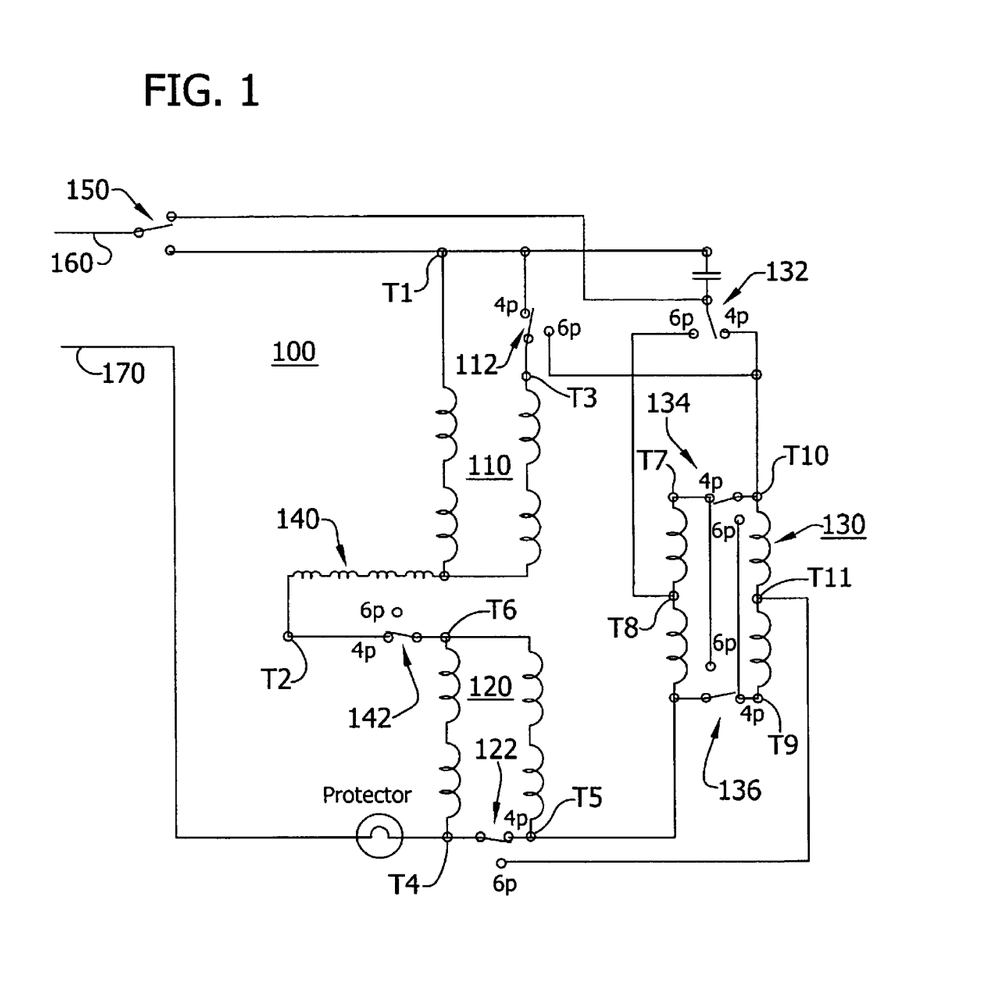
FIG. 1 is a schematic diagram of the electrical circuit of one preferred embodiment of the motor according to the invention illustrating the common winding and the additional winding and their interconnection in both the 4-pole (4p) and 6-pole (6p) configurations.

Referring to FIG. 1, illustrated as a schematic diagram of the electrical circuit of one preferred embodiment of the 4-pole/6-pole permanent split capacitor single-phase induction motor 100 according to the invention. In particular, FIG. 1 illustrates a first winding coil group 110 disposed in magnetic coupling relation with a core (not illustrated). The first winding group 110 includes four coil sets as illustrated. FIG. 1 also illustrates a second winding coil group 120 disposed in magnetic coupling relation to the core (not shown) and which also include four coil sets as illustrated. FIG. 1 also illustrates a third winding coil group 130 disposed in magnetic coupling relation to the core (not shown) and which include four coil sets as illustrated. In accordance with one aspect of the invention, FIG. 1 also illustrates an additional winding coil 140 disposed in magnetic coupling relation with the core.

The motor of FIG. 1 also includes a switch assembly. For convenience, the various switches of the switch assembly have been illustrated within the schematic of FIG. 1. However, it is contemplated that the various switches may be part of an integrated assembly. In any case, it is noted that the number of switches is the same as used in other 4/6 pole motors, such as disclosed in U.S. Pat. No. 5,825,111. In particular, a switch 112 is associated with the first winding coil group 110 to control its configuration in the 4-pole (4p) and in the 6-pole (6p) configurations. Switch 112 includes terminals T3, T1, and T10, which would be connected to the motor assembly as shown. A switch 122 associated with the second coil winding group 120 controls its configuration in the 4p and 6p configurations. Switch 122 includes terminals T4, T5, and T11, which would be connected to the motor assembly as shown. A plurality of switches 132, 134 and 136 are associated with the third winding coil group 130 to control its configuration in the 4p and 6p configurations. Switch 132 has terminals T8 and T10, which are connected to the motor assembly as shown, switch 134 has terminals T7, T10, and T9, which are connected to the motor assembly as shown and switch 136 has terminals T5, T9, and T7, which are connected to the motor assembly as shown. The switches are selectively positioned to change current flow direction in selected windings of the coil sets to provide in one connection a 4-pole configuration in which the additional winding coil 140 is energized. In addition, the switches are selectively positioned to change current flow in selected ones of the coil groups to provide in another connection a 6-pole configuration in which the additional winding coil 140 is not energized. Specifically, switch 142 is closed in the 4-pole configuration whereas it is open in the 6-pole configuration so that the additional winding coil 140 is close-circuited in the 4-pole configuration and is open-circuited in the 6-pole configuration.

FIG. 1 illustrates a switch 150 for selecting forward and backward operations of the motor of FIG. 1. One terminal of switch 150 is connected to T1 of the motor assembly as shown. FIG. 1 also illustrates a pair of line terminals 160, 170 for a connection to an external power source. Thus, FIG. 1 illustrates 4/6-pole PSC motor 100 which, when the switches are in the 4p configuration, has windings energized in a 4-pole configuration in which the additional winding coil 140 is energized. In addition, FIG. 1 illustrates motor 100 which, when the switches are in the 6p configuration, has windings in a 6-pole configuration in which the additional winding coil 140 is not energized.

Figure 2:
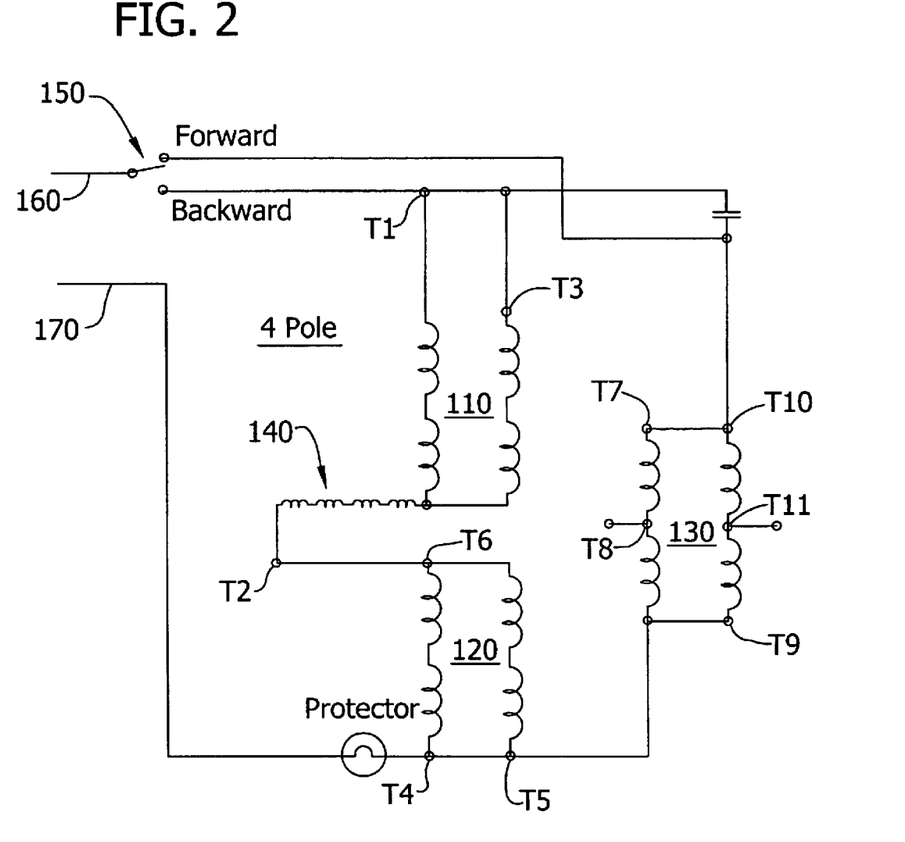
FIG. 2 is a schematic diagram of the electrical circuit of the motor of FIG. 1 illustrating the interconnection of the common winding and the additional winding in the 4-pole (4p) configuration.

Referring to FIG. 2, a schematic diagram of the electrical circuit of the motor of FIG. 1 illustrating the interconnection of the coil sets in the 4-pole configuration is illustrated. In this 4-pole configuration, winding coil groups 110, 120 and 130 each comprise a plurality of coil sets, which are connected in parallel. In addition, the additional winding coil 140 is a plurality of coil sets which are connected between the first winding coil group 110 and the second winding coil group 120.

Figure 3A:
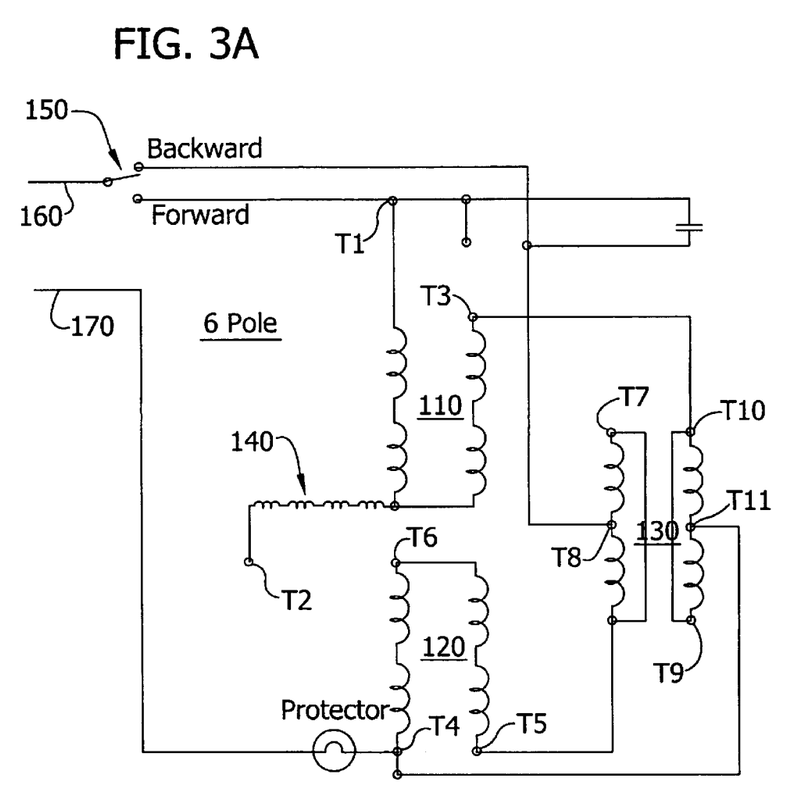
FIG. 3A is a schematic diagram of the electrical circuit of the motor of FIG. 1 illustrating the interconnection of the common winding and the open-circuited additional winding in 6-pole (6p) configuration in which the 6-pole configuration rotates in an opposite direction to the 4-pole configuration when the position of switch 150 is unchanged.

Referring next to FIG. 3A, the 6-pole configuration is illustrated in which the first winding coil group 110 has coil sets which are connected in series and the second winding coil group 120 has coil sets which are connected in series. The third winding coil group 130 is configured as two parallel coil sets and the additional winding coil 140 is open-circuited. FIG. 3A corresponds to the winding configuration illustrated in FIG. 4A. When used in the winding configuration of FIG. 4A to drive vertical axis impeller washers, the 4-pole configuration is reversible by changing the position of switch 150. The 6-pole configuration is used in a reversible mode, too, by changing the position of switch 150. In the winding configuration of FIG. 4A, the 6-pole configuration rotates in the opposite direction to the 4-pole configuration so that the position of switch 150 must be changed in order to rotate the motor in the same direction in both the 4-pole and 6-pole configurations. In particular, comparing FIGS. 2 and 3A, switch 150 must be in the "up" position for forward rotation in the 4-pole configuration as shown in FIG. 2 whereas switch 150 must be in the "down" position for forward rotation in the 6-pole configuration as shown in FIG. 3A. When operating in one direction (e.g., a forward direction) in the 4-pole configuration, the main winding includes the first winding coil group 110, the second winding coil group 120, and the additional winding coil 140 and the auxiliary winding includes the third winding coil group 130. When operating in the other direction (e.g., a backward direction) in the 4-pole configuration, the main winding includes the third winding coil group 130 and the auxiliary winding includes the first winding coil group 110, the second winding coil group 120 and the additional winding coil 140. When operating in the same one direction (e.g., a forward direction) in the 6-pole configuration, the main winding includes the first winding coil group 110 and the right side of the third winding coil group 130 and the auxiliary winding includes the second winding coil group 120 and the left side of the third winding coil group 130. When operating in the other direction (e.g., a backward direction) in the 6-pole configuration, the main winding includes the second winding coil group 120 and the left side of the third winding coil group 130 and the auxiliary winding includes the first winding coil group 110 and the right side of the third winding coil group 130.

The motor 100 according to the invention as illustrated and described herein provides several advantages. Without the additional winding coil 140, the effective turns of the 4-pole configuration are different than the effective turns of the 6-pole configuration. When designing the 6p winding to have an acceptable air-gap flux density, the effective turns of the 4-pole configuration are about 1.5/1.18 of the effective turns of the 6-pole configuration. Thus, without the additional winding coil 140, the 4-pole configuration has 18% higher air-gap flux density than the air-gap flux density of the 6-pole configuration and the stator core can become saturated, especially in the stator yoke area. With the additional winding coil 140 according to the invention, coil 140 is in series with the main winding, for 4-pole forward operation, thereby increasing the effective turns of the main winding. In particular, coil 140 may be configured to increase the effective turns by 18%. As a result, the 4-pole configuration of motor 100 will have the same air-gap flux density as the 6-pole configuration. In other words, with the additional winding coil 140, if the effective turns of the 4-pole configuration are 1.5 times of the effective turns of the 6-pole configuration, both 4-pole and 6-pole configurations will have the same air-gap flux density levels. By adjusting or varying the turns of the additional winding coil 140, the air-gap flux density of the 4-pole configuration of motor 100 can be any desirable number. The air-gap flux density of the 6-pole configuration is independent of the additional winding coil 140, which is open-circuited in the 6-pole configuration.

In summary, the motor 100 of the invention has an air-gap flux in the 4-pole configuration, which is independent of the air-gap flux level in the 6-pole configuration. This is because the air-gap flux levels of the 4-pole configuration can be varied by varying the turns of the additional winding coil 140 without affecting the air-gap flux levels of the 6-pole configuration since the coil 140 is not energized in the 6-pole configuration. As a result, the air-gap flux levels of the 4-pole configuration and of the 6-pole configuration can be configured to be substantially the same.

This is in contrast to prior art 4/6 pole motors, such as illustrated in U.S. Pat. No. 5,825,111, in which the air-gap flux density levels in the 4 and 6-pole configurations are bound together by a fixed ratio. In this previous design according to the '111 patent (without the additional winding coil 140), the effective turns of the 6-pole configuration are determined by the effective turns of the 4-pole configuration. Thus, if the effective turns of the 4-pole configuration are chosen to provide a preferable air-gap flux density, the result is that the effective turns of the 6-pole configuration tend to become too many and, as a result, the flux density of the 6-pole configuration will be lower and less than preferable. On the other hand, if the effective turns of the 6-pole configuration are chosen for a preferred density level, the effective turns of the 4-pole configuration will be less than preferable and, as a result, the flux density of the 4-pole configuration will be higher than preferable. By adding the additional winding coil 140 to motor 100 according to the invention, the air-gap flux density of either the 4-pole or the 6-pole configuration can be independently chosen as needed according to the operation of the motor by choosing the effective turns of the 6-pole configuration and the turn numbers of the additional winding coil 140.

With the additional winding coil 140, in the backward operation, the breakdown torque is increased by the additional turns provided by coil 140. As a result, the breakdown torque of both the forward and backward directions in the 4-pole configuration becomes almost identical. Also, as the motor temperature rises for both directions, it becomes almost identical and can be maintained within a preferred range.

The additional winding coil 140 has no substantial, substantive effect on the operation of the motor 100 in the 6-pole configuration but reduces the saturation level for the 4-pole forward configuration so that operation in the 4-pole forward configuration has the desired saturation levels independent of the operation in the 6-pole configuration. Backward operation in the 4-pole configuration results in a substantially lower saturation than the forward operation because the main winding, the winding 130 in this case, has smaller cross area and higher resistance than the auxiliary winding, the windings 110, 120, and 140. In contrast, in the motor of U.S. Pat. No. 5,825,111, the smaller cross sectional area of the main winding (winding 130) results in the higher current density. However, in the motor 100 of the invention, because of the existence of the additional winding coil 140, the current density in the third winding coil group 130 is substantially reduced for the same load torque while the current density in the auxiliary winding is increased.

Figure 3B:
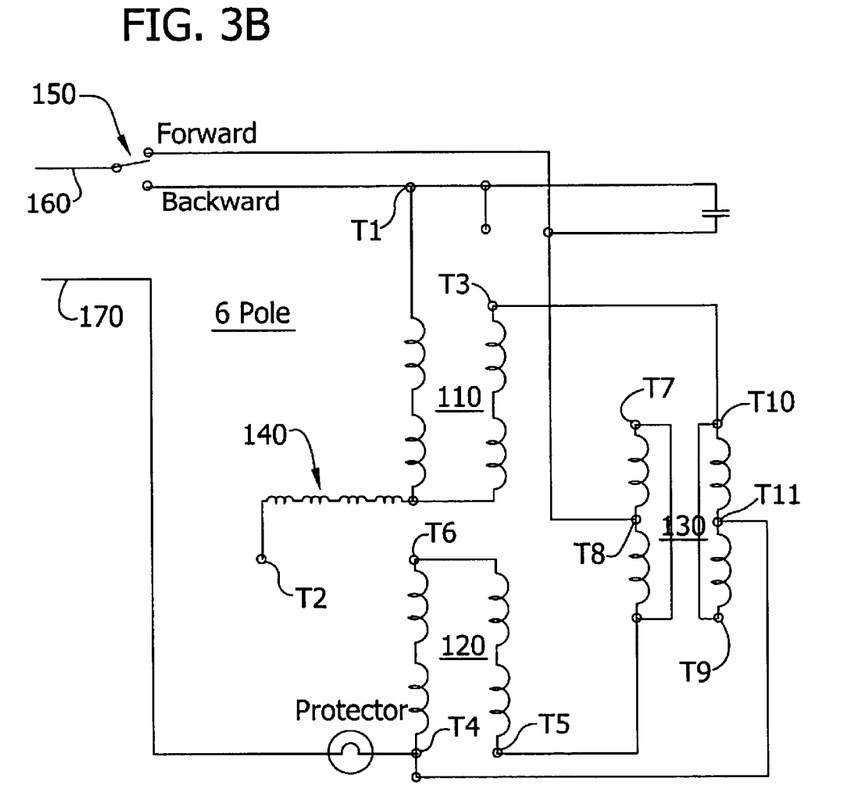
FIG. 3B is a schematic diagram of the electrical circuit of the motor of FIG. 1 illustrating the interconnection of the common winding and the open-circuited additional winding in 6-pole (6p) configuration in which the 6-pole configuration rotates in the same direction to the 4-pole configuration when the position of switch 150 is unchanged.
Figure 4A:
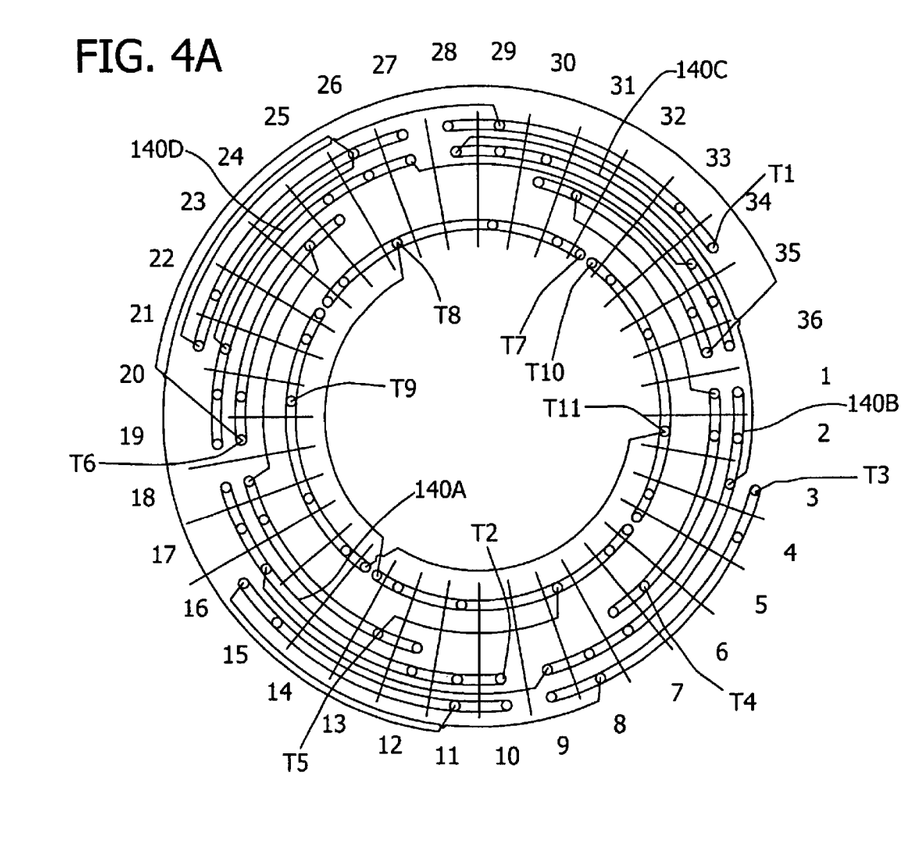
FIG. 4A is a diagrammatic view of the winding distribution of one preferred embodiment of the motor according to the invention in which the 4-pole and 6-pole configurations rotate in opposite directions when the position of switch 150 is unchanged.
Figure 4B:
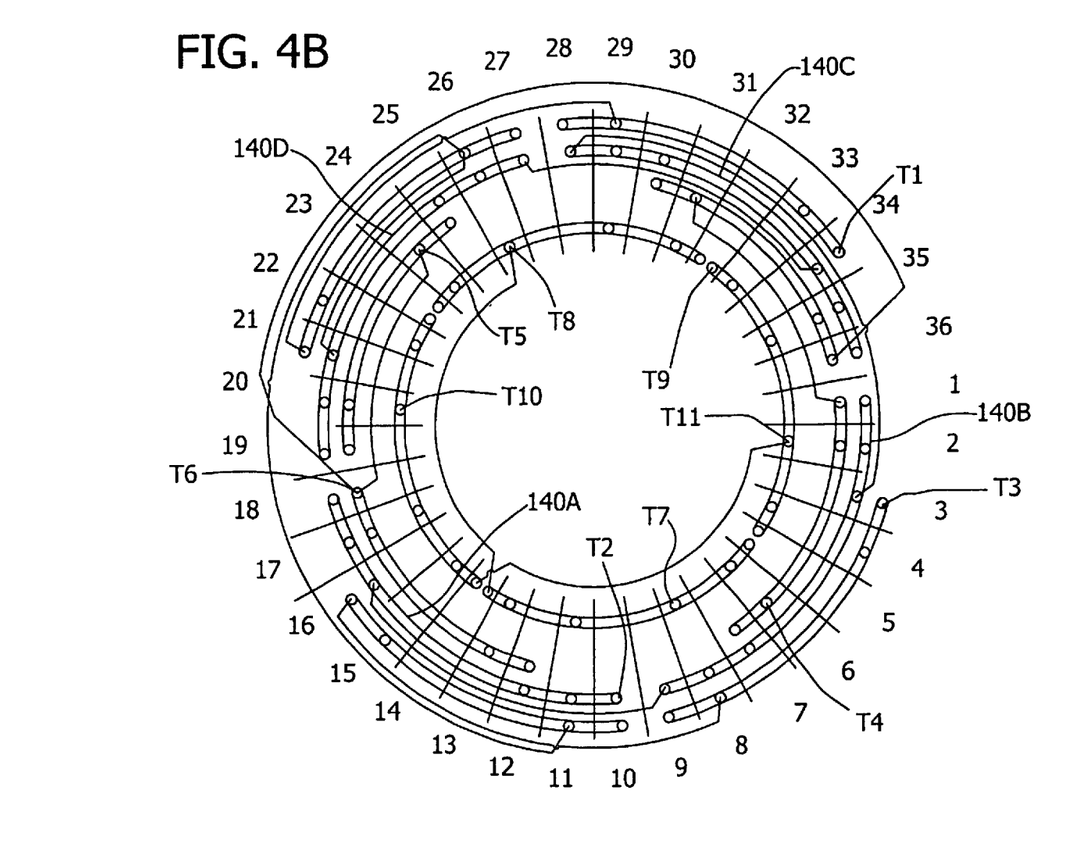
FIG. 4B is a diagrammatic view of the winding distribution of another preferred embodiment of the motor according to the invention in which the 4-pole and 6-pole configurations rotate in same direction when the position of switch 150 is unchanged.

Referring next to FIG. 3B, the 6-pole configuration is illustrated in which the winding coil groups have a similar arrangement as FIG. 3A. In particular, the first winding coil group 110 has coil sets which are connected in series and the second winding coil group 120 has coil sets which are connected in series. The third winding coil group 130 is configured as two parallel coil sets and the additional winding coil 140 is open-circuited. FIG. 3B corresponds to the winding configuration illustrated in FIG. 4B. When used in the winding configuration of FIG. 4B to drive vertical axis impeller washers, the 4-pole configuration is reversible by changing the position of switch 150. The 6-pole configuration is used in a reversible mode, too, by changing the position of switch 150. In the winding configuration of FIG. 4B, the 6-pole configuration rotates in the same direction as the 4-pole configuration so that the position of switch 150 is not changed in order to rotate the motor in the same direction in both the 4-pole and 6-pole configurations. In particular, comparing FIGS. 2 and 3B, switch 150 must be in the "up" position for forward rotation in the 4-pole configuration as shown in FIG. 2 and switch 150 must be in the "up" position for forward rotation in the 6-pole configuration as shown in FIG. 3B. Thus, the difference between the configuration as illustrated in FIGS. 3A and 4A and the configuration as illustrated in FIGS. 3B and 4B is that the configuration of FIGS. 3A and 4A requires the position of switch 150 to change in order to rotate in the same direction in the 4-pole and 6-pole configurations whereas the configuration of FIGS. 3B and 4B requires the position of switch 150 to remain the same in order to rotate in the same direction in the 4-pole and 6-pole configurations. As with the arrangement of FIG. 3A, when operating in one direction (e.g., a forward direction) in the 4-pole configuration, the main winding includes the first winding coil group 110, the second winding coil group 120, and the additional winding coil 140 and the auxiliary winding includes the third winding coil group 130. As with the arrangement of FIG. 3A, when operating in the other direction (e.g., a backward direction) in the 4-pole configuration, the main winding includes the third winding coil group 130 and the auxiliary winding includes the first winding coil group 110, the second winding coil group 120 and the additional winding coil 140. When operating in the same one direction (e.g., a forward direction) in the 6-pole configuration, the main winding includes the first winding coil group 110 and the right side of the third winding coil group 130 and the auxiliary winding includes the second winding coil group 120 and the left side of the third winding coil group 130. When operating in the other direction (e.g., a backward direction) in the 6-pole configuration, the main winding includes the second winding coil group 120 and the left side of the third winding coil group 130 and the auxiliary winding includes the first winding coil group 110 and the right side of the third winding coil group 130.

FIG. 4A is a diagrammatic view of the winding distribution of one preferred embodiment of the motor according to the invention in which the 4-pole and 6-pole configurations rotate in opposite directions when the position of switch 150 is not changed. FIG. 4A corresponds to schematic diagram of FIG. 3A. Winding sets 140A, 140B, 140C and 140D constitute the additional winding coil 140 according to the invention.

FIG. 4B is a diagrammatic view of the winding distribution of another preferred embodiment of the motor according to the invention in which the 4-pole and 6-pole configurations rotate in same direction when the position of switch 150 is not changed. FIG. 4B corresponds to the schematic diagram of FIG. 3B. As with FIG. 4A, winding sets 140A, 140B, 140C and 140D constitute the additional winding coil 140 according to the invention.

Using the winding configuration of FIGS. 3B and 4B for a motor driving an impeller washer (or other two speed applications) provides two advantages. Most impeller washers only allow one direction for spinning. Since the 4-pole and 6-pole configurations operate in the same direction without changing the position of switch 150, the motor can be used to operate both the low speed spin mode and the high speed spin mode without changing the position of switch 150. This can make the machine control simpler. For example, the motor can be used to operate both the low speed spin mode (6-pole forward operation) and the high speed spin mode (4-pole forward operation) in addition to operating the washing mode (6-pole forward and reverse operation). In addition, a relay may be used to switch between 4-pole operation and 6-pole operation. In particular, the relay would operate switches 112, 122, 132, 134, 136 and 142. In the event that the relay control coil looses power causing the relay to change position from the 4-pole to the 6-pole configuration or visa versa, the motor does not reverse its direction of rotation. In contrast, in the winding configuration of FIGS. 3A and 4A, if a relay is used to switch between the 4-pole operation and 6-pole operation, the motor would reverse its direction of rotation in the event that the relay control coil looses power. A sudden reverse can damage the motor shaft.

Figure 5:
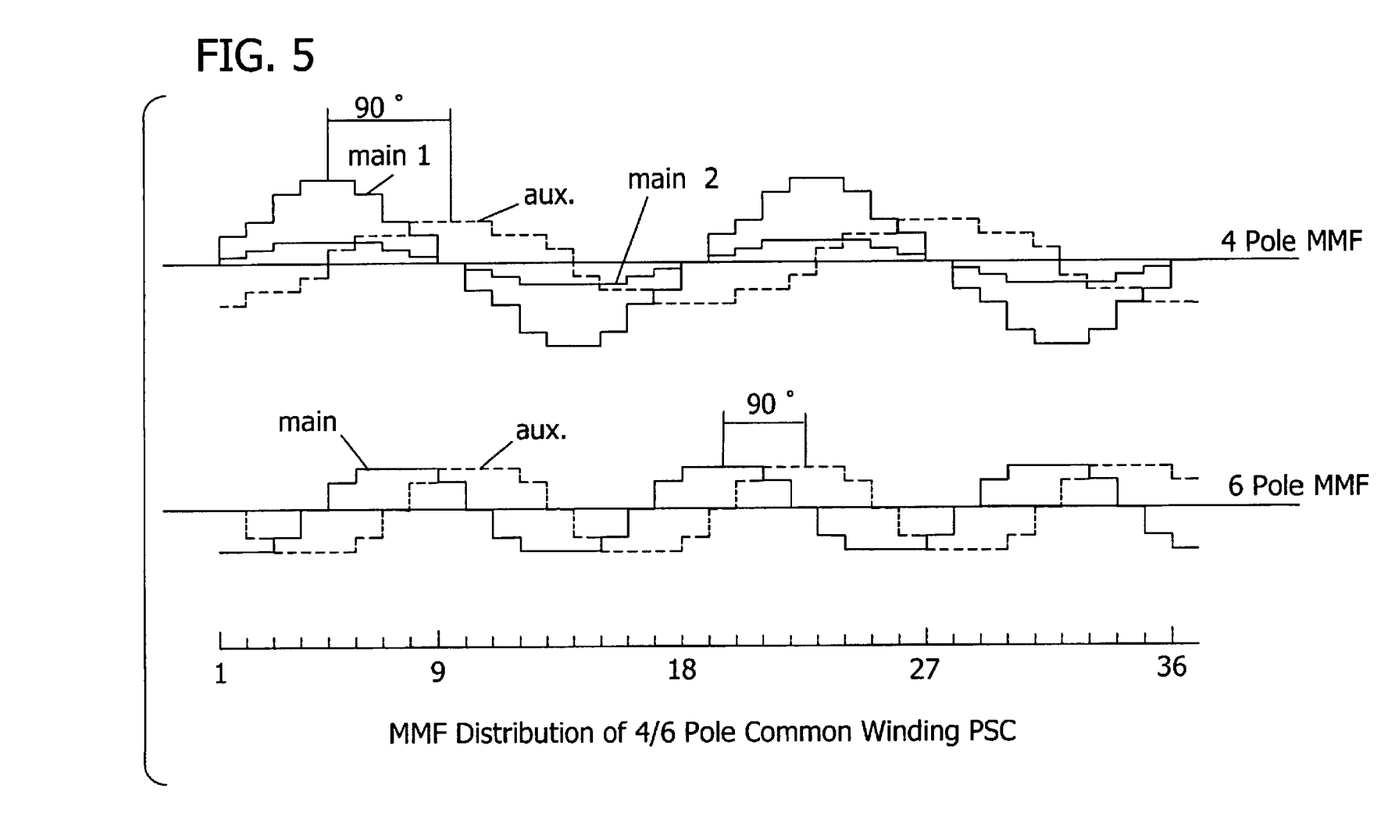
FIG. 5 is a graph illustrating the magnetic motive force of one preferred embodiment of the motor according to the invention with poles along the horizontal x-axis and magnetic motive force (MMF) along the vertical y-axis, the solid lines indicating the main windings MMF and the dashed lines indicating the auxiliary windings MMF.

FIG. 5 is a graph illustrating the magnetic motive force of one preferred embodiment of the motor according to the invention with poles along the horizontal x-axis and the magnetic motive force illustrated along the vertical y-axis. In FIG. 5, the solid lines indicate the main windings MMF and the dashed lines indicate the auxiliary windings MMF for the forward operation. FIG. 5 illustrates one feature of the invention in that in both the 4-pole and 6-pole configurations the magnetic motive force generated is symmetrically distributed about an air-gap between the rotor and stator of the motor. In FIG. 5, main 1 refers the mmf produced by the windings 110 and 120, main 2 refers to the mmf produced by the additional winding of 140.

It is also contemplated that the invention is applicable to motors other than 4/6 pole motors. For example, the motor 100 of the invention may be a stator core and a rotor mounted in rotational relationship with the stator core. A plurality of windings components (110, 120, 130) including an additional winding component (140) are wound on the stator core. According to one aspect of the invention, the winding components are configured to be selectively energized to operate the motor in a 4N-pole configuration, where N is an integer equal to or greater than one. In the 4N-pole configuration, the plurality of winding components and the additional winding component are energized. In addition, the winding components are configured to be selectively energized to operate the motor in a 6N-pole configuration in which the plurality of winding components only are energized. As a result, the additional winding component is not energized in the 6N-pole configuration and the additional winding component is energized only in the 4N-pole configuration. FIGS. 1–5 relate to a specific example of this motor in which N=1. However, N may be any integer. For example, N may be equal to 2 for a 8/12 pole motor.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. In a 4/6 pole PSC motor having main and auxiliary winding configurations and having common windings energized in both a 4-pole configuration and energized in a 6-pole configuration for both the main and the auxiliary winding configurations, the improvement comprising an additional winding energized in the 4-pole configuration only whereby the air-gap flux level of the 4-pole configuration can be varied substantially independent of the air-gap flux level of the 6-pole configuration by varying the configuration of the additional winding.

2. The motor of claim 1 having a first winding, a second winding and a third winding and:

wherein the 4-pole configuration is reversible;

wherein when operating in one direction in the 4-pole configuration the main winding includes the first, second and additional winding and the auxiliary winding includes the third winding; and wherein when operating in the other direction in the 4-pole configuration the main winding includes the third winding and the auxiliary winding includes the first, second and additional windings.

3. The motor of claim 1 wherein the additional winding has a configuration such that the effective turns of the 4-pole configuration are substantially 1.5 of the effective turns of the 6-pole configuration whereby the air-gap flux density levels of the 4-pole configuration and of the 6-pole configuration are substantially the same.

4. The motor of claim 3 wherein the main windings and the additional winding are configured, when energized in both the 4-pole configuration and the 6-pole configuration, to generate magnetic motive forces which are symmetrically distributed about an air-gap between a rotor and a stator of the motor.

5. The motor of claim 4 having a first winding, a second winding and a third winding and:

wherein the 4-pole configuration is reversible;

wherein when operating in one direction in the 4-pole configuration the main winding includes the first, second and additional winding and the auxiliary winding includes the third winding; and wherein when operating in the other direction in the 4-pole configuration the main winding includes the third winding and the auxiliary winding includes the firt, second and additional windings.

6. The motor of claim 1 wherein the main windings and the additional winding are configured, when energized in both the 4-pole configuration and the 6-pole configuration, to generate magnetic motive forces which are symmetrically distributed about an air-gap between a rotor and a stator of the motor.

7. The motor of claim 1 first comprising a switch connected to the windings and having a first position and a second position wherein when the switch is in the first position the windings are configured to rotate the motor in one direction when energized in both the 4-pole configuration and the 6-pole configuration and wherein when the switch is in the second position the windings are configured to rotate the motor in the other direction when energized in both the 4-pole configuration and the 6-pole configuration.

8. The motor of claim 7 further comprising a relay switch connected to the windings for selectively operating the motor in the 4-pole configuration and 6-pole configuration.

9. A motor comprising:

a stator core;

a rotor mounted in rotational relationship with the stator core;

a plurality of windings components wound on the stator core;

an additional winding component wound on the stator core;

wherein the winding components are configured to be selectively energized to operate the motor in a 4N-pole configuration, where N is an integer equal to or greater than one, in which the plurality of winding components and the additional winding component are energized; and wherein the winding components are configured to be selectively energized to operate the motor in a 6N-pole configuration in which the plurality of winding components only are energized such that the additional winding component is not energized in the 6N-pole configuration and the additional winding component is energized only in the 4N-pole configuration.

10. The motor of claim 9 wherein the plurality of winding components comprises a first winding component, a second winding component and a third winding component and:

wherein the 4N-pole configuration is reversible;

wherein when operating in one direction the 4N-pole configuration has a main winding including the first, second and additional winding components and has an auxiliary winding including the third winding component; and wherein when operating in the other direction the 4N-pole configuration has a main winding including the third winding component and has an auxiliary winding including the first, second and additional winding components.

11. The motor of claim 10 wherein the plurality of winding components and the additional winding component are configured, when energized in both the 4N-pole configuration and the 6N-pole configuration, to generate magnetic motive forces which are symmetrically distributed about an air-gap between the rotor and the stator of the motor.

12. The motor of claim 11 wherein N=1 and wherein the plurality of winding components comprises a first winding component, a second winding component and a third winding component and:

wherein the 4-pole configuration is reversible;

wherein when operating in one direction the 4-pole configuration has a main winding including the first, second and additional winding components and has an auxiliary winding including the third winding component; and wherein when operating in the other direction the 4-pole configuration has a main winding including the third winding component and has an auxiliary winding including the first, second and additional winding components.

13. The motor of claim 9 wherein the additional winding component has a configuration such that the effective turns of the 4N-pole configuration are substantially 1.5 of the effective turns of the 6N-pole configuration whereby the air-gap flux density levels of the 4N-pole configuration and of the 6N-pole configuration are substantially the same.

14. The motor of claim 9 wherein the plurality of winding components and the additional winding component are configured, when energized in both 4N-pole configuration and in the 6P-pole configuration, to generate magnetic motive forces which are symmetrically distributed about an air-gap between the rotor and the stator of the motor.

15. The motor of claim 9 first comprising a switch connected to the windings and having a first position and a second position wherein when the switch is in the first position the windings are configured to rotate the rotor in one direction when energized in both the 4N-pole configuration and the 6N-pole configuration and wherein when the switch is in the second position the windings are configured to rotate the rotor in the other direction when energized in both the 4N-pole configuration and the 6N-pole configuration.

16. The motor of claim 15 further comprising a relay switch connected to the windings for selectively operating the motor in the 4N-pole configuration and the 6N-pole configuration.

17. An electric motor system comprising:
   a pair of line terminals for connection to an external source of power;
   a stator core;
   a first winding coil group disposed in magnetic coupling relationship with said core, said first winding coil group including four coil sets;
   a second winding coil group disposed in magnetic coupling relationship to said core, said second winding coil group including four coil sets;
   a third winding coil group disposed in magnetic coupling relationship with said core, said third winding coil group including four coil sets;
   an additional winding coil disposed in magnetic coupling relationship with said core, said additional winding coil including additional coil sets; and
   a switch assembly operatively connected to said first, said second, and said third winding coil groups and to said additional winding coil so as to change current flow direction in selected ones of said coil sets to provide a 4-pole configuration in one connection in which the additional winding coil is energized, and a 6-pole configuration in another connection in which the additional winding coil is not energized.

18. The motor of claim 17 wherein the 4-pole configuration is reversible wherein when operating in one direction the 4-pole configuration has a main winding including the first winding coil group, the second winding coil group and the additional winding coil group and has an auxiliary winding including the third winding coil group; and
   wherein when operating in the other direction the 4-pole configuration has a main winding including the third winding coil group and has an auxiliary winding including the first winding coil group, the second winding coil group and the additional winding coil group.

19. The motor of claim 17 wherein the additional winding has a configuration such that the effective turns of the 4-pole configuration are substantially 1.5 of the effective turns of the 6-pole configuration whereby the air-gap flux density levels of the 4-pole configuration and of the 6-pole configuration are substantially the same.

20. The motor of claim 19 wherein the first, second and third winding coil groups and the additional winding coil are configured, when energized in both the 4-pole configuration and the 6-pole configuration, to generate magnetic motive forces which are symmetrically distributed about an air-gap between the rotor and the stator of the motor.

21. The motor of claim 20 wherein the 4-pole configuration is reversible wherein when operating in one direction the 4-pole configuration has a main winding including the first winding coil group, the second winding coil group and the additional winding coil group and has an auxiliary winding including the third winding coil group; and
   wherein when operating in the other direction the 4-pole configuration has a main winding including the third winding coil group and has an auxiliary winding including the first winding coil group, the second winding coil group and the additional winding coil group.

22. The motor of claim 17 wherein the fist, second and third winding coil groups and the additional winding coil are configured, when energized in both 4-pole configuration and in the 6-pole configuration, to generate magnetic motive forces which are symmetrically distributed about an air-gap between the rotor and the stator of the motor.

23. The motor of claim 17 first comprising a switch connected to the winding coil groups and having a first position and a second position wherein when the switch is in the first position the winding coil groups are configured to rotate the motor in one direction when energized in both the 4-pole configuration and the 6-pole configuration and wherein when the switch is in the second position the winding coil groups are configured to rotate the motor in the other direction when energized in both the 4-pole configuration and the 6-pole configuration.

24. The motor of claim 23 wherein the switch assembly comprises a relay switch.

* * * * *